April 15, 1930.     A. KUENNE     1,755,067
SAW
Filed March 8, 1928
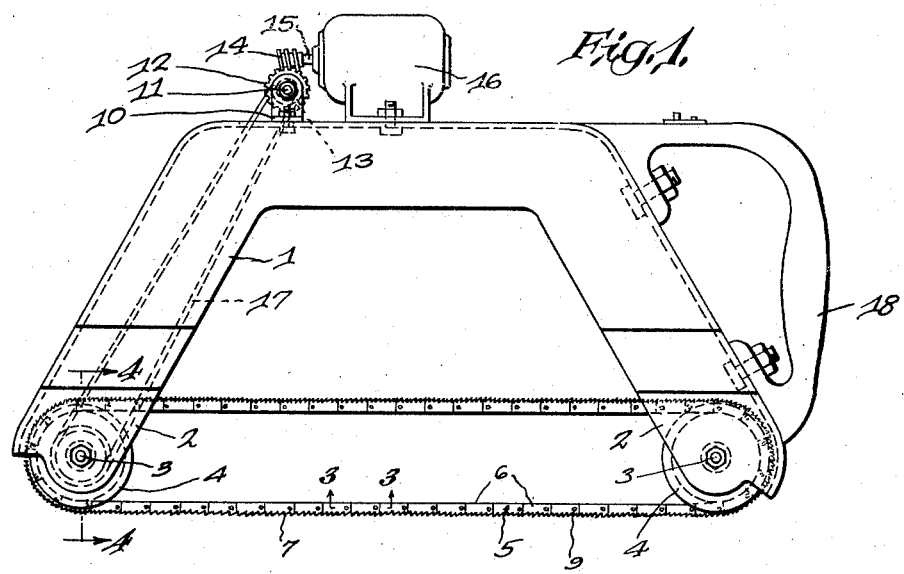
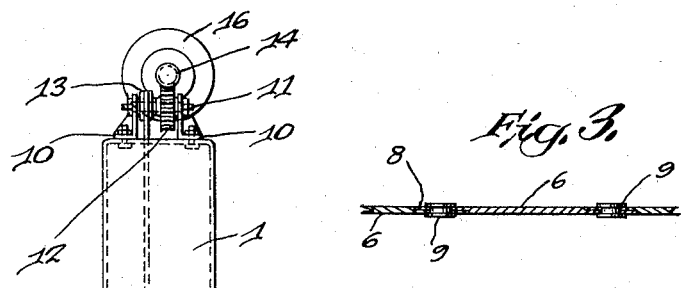
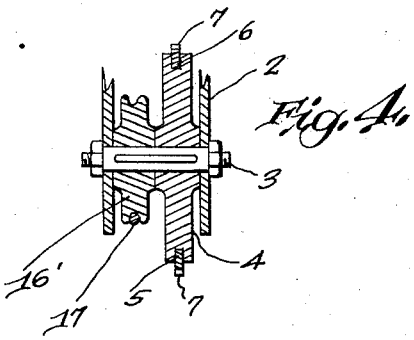
Arthur Kuenne
INVENTOR
ATTORNEY
WITNESS Patented Apr. 15, 1930

1,755,067

UNITED STATES PATENT OFFICE

ARTHUR KUENNE, OF CHICAGO, ILLINOIS

SAW

Application filed March 8, 1928. Serial No. 260,233.

This invention relates to new and useful improvements in saws, and more particularly to hand operated band saws. One of the objects of my invention is the provision of a hand saw of the above type which can be readily transported from place to place and conveniently used wherever there is use for a hand saw.

Another object of my invention is the provision of a hand saw of the motor operated type wherein the saw blade is of a flexible band type comprising a plurality of pivotally connected sections and wherein the saw blade and motor for driving the blade are carried by a novel type of frame, so that they can be easily positioned to the work at the will of the operator.

With the above and other objects in view the invention consists in the novel features of construction, the combination and arrangement of parts hereinafter more fully set forth, pointed out in the claim and shown in the accompanying drawings, in which Figure 1 is a side elevation of my improved saw.

Figure 2 is an end elevation, parts thereof broken away and shown in cross section.

Figure 3 is a cross sectional view on the line 3—3 of Figure 1, and

Figure 4 is a detail sectional view on the line 4—4 of Figure 1.

Referring in detail to the accompanying drawing wherein reference characters are used to designate the several parts, it will be noted that the body of my improved device comprises a substantially U-shaped frame 1, hollow in cross section and having its ends reduced in size as shown at 2. Mounted in the reduced end portions are the shafts 3 upon which the pulleys 4 are mounted.

The saw-blade 5 comprises a plurality of section plates 6 each having one of their longitudinal edges formed with saw teeth 7 and having their ends reduced as at 8, so that the ends of adjacent blades can be arranged in overlapping relation and pivotally connected by the pins 9. The saw blade 5 is passed around the pulleys 4 and is deposed in grooves in said pulleys, it being manifest that the saw blade is formed to provide an endless belt arrangement.

Mounted on the intermediate portion of the frame 1 are the brackets 10 which support a shaft 11 and mounted on the shaft between the brackets 10 is a worm gear 12 and a pulley 13, the gear 12 meshing with a worm 14 on the motor shaft 15. The motor 16 is fixed to the frame 1 adjacent the brackets 10 and can be connected to a source of current supply in any convenient manner.

Mounted on one of the shafts 3 adjacent the pulley 4 is a small pulley 16', which is connected to the pulley 13 by means of a belt 17, so as to drive the saw-blade 5 around the pulleys 4. Attached to one side portion of the frame 1 is a handle member 18, the outer end portion of which is flush with the outer side face of the frame 1, as shown in Figure 1. From this it will be apparent that the saw may be easily manipulated and guided by the operator.

It will be apparent from the foregoing description given above that I have provided a new and useful type of portable, motor operated hand saw which can be easily carried about and quickly placed ready for use in various places that a hand saw can be used and at the same time is of such construction that it can be manufactured and placed on the market at a nominal cost.

While I have shown and described the preferred embodiment of my invention, it will be apparent that various changes and alterations can be carried out when putting the invention into practice without departing from the spirit of the invention or the scope of the appended claim.

I claim as my invention:

In a device of the class described and in combination, a substantially U-shaped frame, hollow in cross section, and having reduced end portions, shafts in the reduced end portions, pulleys on said shafts, a sectional bandsaw passing around said pulleys, a second pulley on one of the shafts, spaced brackets on the intermediate portion of the frame, a shaft supported by said brackets, a worm gear on the latter shaft, a pulley on the last shaft, a belt connecting the last pulley with the second pulley on one of the first shafts, a motor adjacent the brackets, a worm on the drive shaft of the motor engaging the worm gear for imparting movement to the saw-blade, and a handle member secured to one side of the frame whereby to manipulate said frame.

In witness whereof, I have hereunto set my hand this 24th day of February, A. D. 1928.

ARTHUR KUENNE.